Sept. 29, 1953  W. A. BRUCE  2,654,067
CUT POINT DETERMINATION IN PIPE LINE BATCHING
Filed Oct. 18, 1950  2 Sheets-Sheet 1

William A. Bruce Inventor
By W. O. Hilman Attorney

Patented Sept. 29, 1953

2,654,067

UNITED STATES PATENT OFFICE 2,654,067

CUT POINT DETERMINATION IN PIPE-LINE BATCHING

William A. Bruce, Tulsa, Okla., assignor to Standard Oil Development Company, a corporation of Delaware Application October 18, 1950, Serial No. 190,819

3 Claims. (Cl. 324—61)

The present invention relates to an improved method for detecting batch changes when separate batches of different petroleum liquids are being transported through the same pipeline. More particularly the invention concerns a method and apparatus for detecting such batch changes by continuous measurement of the dielectric properties of the liquid flowing through the pipeline.

One of the common means of transporting crude oils and petroleum products is through pipelines. It is a usual practice, in order to make the fullest use of pipeline facilities, to send successive batches of different crudes or of different intermediate or finished products through the same pipeline. Ordinarily, the standard technique for determining the position of the batch head and spread of contamination in products systems is by measurement of the gravity with a hydrometer on samples withdrawn from the line. This same procedure is also followed on crude oil lines. Both products and crude lines make some use of automatic gravitometers, principally to furnish a check on uniformity within the batch rather than to measure and record the exact batch change. This procedure is followed because usually such automatic devices operate continuously and over a wide gravity range and hence do not have sufficient sensitivity to give the minute control necessary in determining the cut point.

Pipelines handling finished products can be designed for minimum contamination because operating conditions are relatively fixed whereas pipeline systems handling crude oils must retain flexibility to handle the varying quality and quantities of crude furnished. It is necessary to segregate the various types of crudes when they reach the refinery because of the difference in the nature and quantity of products that can be most economically made from each type of crude oil. If contamination occurs by the admixture of one type of crude with another an economic loss results because part of the crude must go into a refining process for which it is not best suited.

Differences in gravity can not always be relied upon for determining cut points between batches of crude oil because in many instances the gravities of successive batches may be too closely similar. This is not a serious problem when handling finished products since, when the successive batches of the latter are of essentially the same gravity, color changes in the samples withdrawn from the pipeline can be employed as a control test. If the two products are colorless or of the same color a plug of dye may be inserted between batches and batching established by color comparison. The color comparison technique can not be employed reliably in the handling of crude oil, however, because of the opaque nature of most crudes; hence cuts must be made on the basis of calculation of capacity of the pipe line as related to the size of the batch being sent through when the cut can not be determined by gravity measurements.

It is thus apparent that there has been a need for a more satisfactory method of determining when a batch change occurs in a pipe line handling successive batches of crudes of different types.

One object of this invention is to provide a method and apparatus for making a reliable determination of the proper cut point between successive batches of crude oils or other petroleum liquids flowing through pipelines. A further object is to provide a cut point determining method that is independent of gravity differences between batches and hence will indicate a batch change even if successive batches have essentially the same gravity.

It has now been found that cut points between successive batches of different crude oils flowing through a pipe line as well as the extent of mixing at the point of contact of two successive batches can be very satisfactorily determined by continuously checking the dielectric properties of the liquids as they pass a selected point in the line and noting a batch change when the dielectric constant and/or the power factor characteristics of the liquid stream undergo a change.

The dielectric constant of a substance, also sometimes called its specific inductive capacitance, is defined as the ratio of the capacitance measured on a given electrical capacitor, when using that particular substance as the dielectric material between the plates of the capacitor, to the capacitance of the same electrical capacitor when using air as the dielectric material. The dielectric power factor of the substance is defined as the ratio of energy loss in the capacitor to the energy applied to the capacitor when that particular substance is employed as the dielectric. When air is employed as the dielectric the power loss is so small as to be negligible; hence air may be assumed to have a power factor of zero.

The nature and objects of this invention will be more clearly understood from the ensuing description when taken in conjunction with the accompanying drawings in which.

Figure 1:
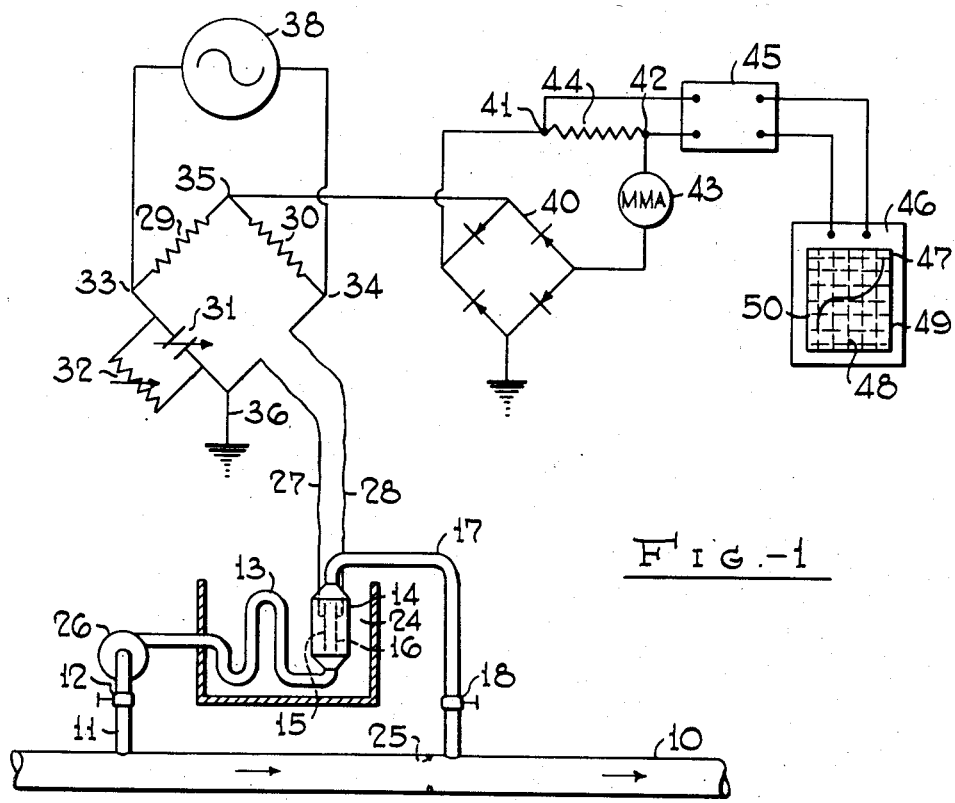
Figure 1 is a schematic diagram showing the general arrangement of suitable means for sampling the liquids flowing through a pipeline together with a bridge circuit and a recording circuit for measuring changes in the dielectric properties of the liquid sample.

Referring now particularly to Figure 1, it is seen that a sampling line 11 is cut into pipeline 10 at or near the point at which the batch change is to be detected. The proper pressure differential to insure flow of the sample side stream through the sampling line may be obtained by placing a constriction 25 in the pipeline ahead of the return line 17 or by employing a small pump 26. Valves 12 and 18 are provided for closing off the sampling line when not in use. The side stream flows through a capacitor cell 14 where it serves as the dielectric for a capacitor made up of plates 15 and 16. Since temperature variations will sometimes affect the readings, a coil 13 immersed in a constant temperature bath 24 is provided in the flow line in order to bring the fluid to a desired temperature before passing it through the capacitor cell. Best results will be obtained by having both coil 13 and capacitor cell 14 immersed in the constant temperature bath.

The capacitor comprising plates 15 and 16 is connected into and forms one arm of a modified capacitance bridge circuit, two of the other arms of which consist of two fixed resistors 29 and 30. The balancing arm of the bridge consists of a variable capacitor 31 across which is shunted a variable resistor 32. The bridge is fed at points 33 and 34 by oscillator 38 which is preferably one having variable adjustments for both frequency and voltage. The output of the capacitance bridge at points 35 and 36 is fed into a full wave bridge rectifier 40. For convenience, point 36 is tied to the common ground of the circuit. The rectified voltage is fed into a recorder 46, having first been amplified, if necessary, by a suitable amplifier 45. Recorder 46 is equipped with a moving chart 47 having coordinates 48 and 49 to indicate changes in measured voltage with time. The record made on the chart is represented by line 50.

When the bridge is energized by the oscillator, the bridge is balanced by adjusting capacitor 31 and resistor 32 so that the resistance and capacitance of the variable arm will be exactly equal to the resistance and capacitance of the capacitor comprising plates 15 and 16 and the particular liquid then flowing through the capacitor cell. Adjustment of capacitor 31 will set the bridge for the dielectric constant of the particular liquid in the cell while adjustment of resistor 32 will set the bridge for the dielectric power factor of the particular liquid in the cell. Both adjustments must be made to bring the bridge into balance. Hence, it follows that, at the time of a batch change, that is when a second liquid having either a different dielectric constant or a different dielectric power factor than the first liquid passes through the cell the bridge will become unbalanced, and a voltage difference will occur across terminals 35 and 36. This voltage will be rectified by bridge rectifier 40, the rectified voltage will be fed into amplifier 45, and the amplified voltage will be fed into recorder 46. A shift in the position of recorded line 50 on chart 47 will indicate that a batch change has occurred.

As a specific example of an operable circuit, oscillator 38 may be one that furnishes an output which may be varied from zero to about 100 volts and which furnishes oscillations in the range of about 100 to 20,000 cycles. Preferably a frequency in the range of about 5000 to about 15,000 cycles is employed. Resistors 29 and 30 will have resistances of 25,000 ohms. Variable capacitor 31 will be adjustable in the range of 200 to 280 micromicrofarads, and resistor 32 may be a potentiometer adjustable from 0 to 5 megohms resistance. Depending on the particular type of recorder employed, amplifier 45 may or may not be needed, or it may form an integral part of the recorder 46. Although the output from rectifier 40 may be fed directly into the amplifier, more satisfactory adjustment of the instrument is obtained by loading this output by the resistor 44, as shown in Figure 1. Microammeter 43 placed in the line serves as a check on the reading on the recorder. As a specific example, resistor 44 may have a resistance of 300 ohms.

In the actual operation of the instrument the instrument sensitivity is adjusted by setting the oscillator output voltage to a level which has been determined by test to give the maximum shift on the recorder for the particular change in dielectric constant and/or dielectric power factor that is expected to occur. With a sample stream of the liquid from the pipeline flowing through the capacitor cell 14, the capacitance bridge is balanced by alternating adjustment of the two bridge balance controls, that is capacitor 31 and resistor 32. Microammeter 43 is employed as an indicator for major adjustment of the bridge and then, as balance of the bridge is approached and the recorder reads at or about zero on the scale, the recorder itself is used as the indicator of balance. Balance is obtained when the recorder reads at its minimum or as near zero as possible. This feature of the invention is a valuable one since it permits the recording instrument to be put on scale rapidly when adjusting the balance of the bridge. The microammeter arrangement is also useful to furnish a quick check on whether or not the instrument is operating properly.

It will be found that the recorder will move a few chart units within the first 10 or so minutes during the warm up of the instrument and thereafter, when again balanced, will readily detect changes that occur in either the dielectric constant or the dielectric power factor of the liquid stream flowing through the capacitor cell. Recorder 46 may be operated continuously or may be started within one-half hour before the expected arrival of the batch change. Although recorder 46 as shown in Figure 1 is of the type producing a rectangular chart, a circular chart recorder having a two hour chart rotation clock will be satisfactory when using the technique of starting the recorder within an hour before an expected batch change. If desirable an alarm device may be connected to the recorder to call attention to a predetermined amount of shift in the balance of the bridge and thus announce the batch change. Recorders with such devices are commercially available.

Figure 2:
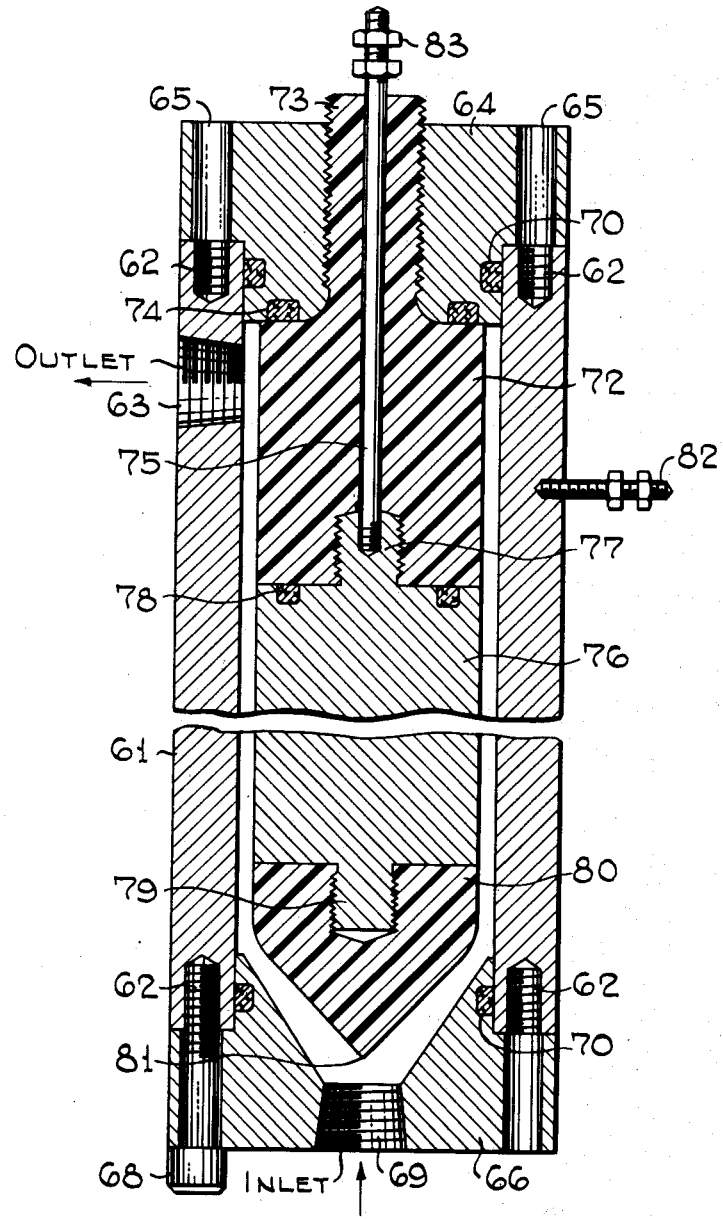
Figure 2 is a vertical sectional view of one form of capacitor cell that is particularly suited for use in practicing this invention; and, Figure 3 is a graphic comparison of the variation of dielectric constant and of dielectric power factor with oscillator frequency for several different crude oils.

An especially desirable design of capacitor cell or chamber for use in practicing this invention is shown in Figure 2. This particular cell is described and claimed in copending application Serial Number 190,831 of Francis M. Bower, filed October 18, 1950, now U. S. Patent No. 2,623,928, issued December 30, 1952. The cell consists of an outer cylindrical tube 61 provided at each end with threaded openings 62 which receive threaded bolts 68 holding in position top and bottom end members 64 and 66. The bottom end member 66 has a threaded central inlet 69 and a threaded outlet is provided in the wall of tube 61 just below top end member 64. Suitable conduits may be attached to each of these openings. An insulating holder 72 having a threaded end portion 73 is screwed into a central opening in end member 64. The lower end of holder 72 has a threaded central recess into which is screwed a threaded end 77 of a central metallic rod 76. The lower end of rod 76 is provided with a threaded projection 79 onto which is screwed a nonconducting tip portion 80. A number of ring gasket seals 70, 74 and 78 are used to prevent leakage of liquid past the various parts that are fitted together as described. Since rod 76 is insulated from outer tube 61 by virtue of the nonconducting properties of holder 72, it will be seen that tube 61 and rod 76 can serve as the two plates of a capacitor. Electrical communication is established with rod 76 by means of conductor 75 passing down through holder 72. Suitable leads connected to the bridge circuit of Figure 1 may be attached to the two plates of the capacitor by connectors 82 and 83. Thus it will be seen that a fluid to be tested may be led into the cell through inlet 69 to flow in the annular space between rod 76 and tube 61 where it will serve as the dielectric of the capacitor. The fluid leaves the cell through outlet 63. Tip 80 has a tapered point 81 centered on inlet 69 to insure uniform distribution of the liquid in the annulus and to minimize turbulent flow. Holder 72 and tip 80 are preferably made of a suitable plastic material such as Bakelite-impregnated laminated cloth. Best results are obtained if tube 61 and rod 76 are constructed of stainless steel.

Figure 3:
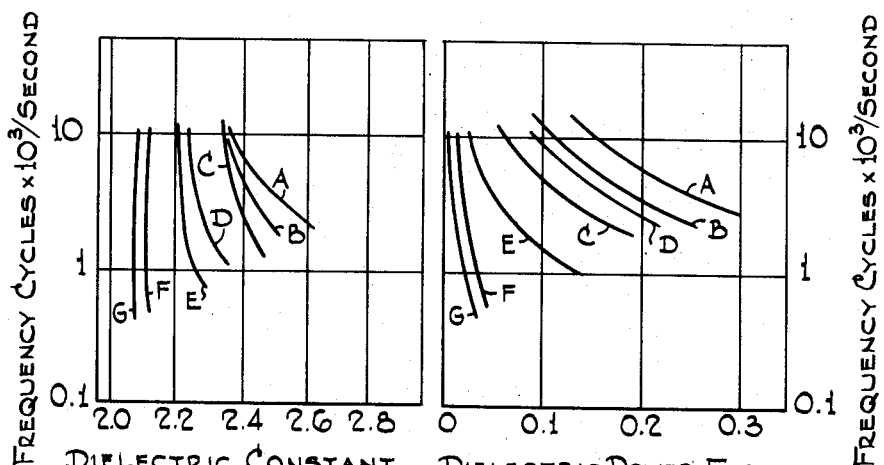

The effect of the frequency setting of the oscillator feeding the capacitor bridge circuit upon the measurement of dielectric constant and dielectric power factor for various oil samples that have been tested by the method of the present invention is shown graphically in Figure 3. In each instance the dielectric constant was determined from the setting of capacitor 31 and the dielectric power factor was determined from the setting of resistor 32 necessary to bring the bridge into balance when the particular oil under test was in cell 14, the liquid temperature being maintained at 80° F. The curves labelled A, B, C, and so forth, were obtained with oils identified as follows:

| Curve | Crude Sample Source | Gravity ° A. P. I. |
| --- | --- | --- |
| A | East Texas | 37.2 |
| B | E. Herald Field, Illinois | 38.0 |
| C | Mid Continent | 33.0 |
| D | Stoney Lake Pool, Michigan | 43.6 |
| E | N. Kenner Field, Illinois | 36.5 |
| F | W. Edmond Field, Oklahoma | 41.6 |
| G | W. Edmond Field, Oklahoma | 42.7 |

It will be noted from the above table and from the graphs that oils of almost the same gravity can be readily distinguished on either the basis of their dielectric constant or their dielectric power factor. It will also be noted that the dielectric power factors of these oil samples vary over a greater frequency range than do their dielectric constants. Hence, it is possible to distinguish two oils of almost the same dielectric constant on the basis of their differences in dielectric power factor. The graphs on Figure 3 also shown that the most desirable oscillator frequency for distinguishing various oils on the basis of either of these dielectric properties lies in the range of about 5,000 to about 15,000 cycles.

In summary it will be seen that this invention consists in a method of determining when a batch change occurs, at a selected point in a pipeline, between successive batches of petroleum liquids flowing through the pipeline, which comprises continuously passing a stream of the liquid, flowing through the pipeline at the point selected, through a detection zone, continuously measuring both the dielectric constant and the dielectric power factor of the liquid in the detection zone and detecting a change in either dielectric constant or dielectric power factor, or both, as an indication of the batch change. This is preferably done by employing the liquid as the dielectric in an electrical capacitor constituting one leg of a capacitance bridge, a second leg of which consists of a variable capacitor and a variable resistor in parallel, so that the bridge can be balanced both as to the dielectric constant of the liquid and as to its dielectric power factor, the extent to which the variable capacitor and variable resistor must be adjusted constituting a measure of these properties. Thus a subsequent unbalance of the bridge, brought about by a change in either the dielectric power factor or the dielectric constant of the liquid in the detection zone serves as an indication of a batch change. The method is particularly adapted for detecting batch changes between crude oils, which vary widely in dielectric power factor, particularly when measured in the range of about 5,000 to about 15,000 cycles, which is the range preferred in practicing this invention.

The invention also involves apparatus for conducting the batch change detecting method just described, this apparatus comprising an electrical capacitor, means for conducting a continuous flow of at least a portion of a pipe line stream through the capacitor to function as the dielectric in the capacitor and electrical means for detecting changes in the dielectric constant and dielectric power factor of the liquid stream. Preferably the latter electrical means consists of an A. C. capacitance bridge of which the aforementioned capacitor constitutes one leg and of which a second leg consists of a variable capacitor and a variable resistor in parallel, an oscillator feeding the input of the capacitance bridge, means for rectifying the output of the bridge and potential measuring means fed by the rectifying means. To facilitate balancing the bridge it is preferred that a fixed resistor and suitable current measuring means, e. g., a microammeter, be shunted in series across the output of the rectifying means and that the potential measuring means be connected to the terminals of the latter fixed resistor so that the current measuring means can be employed to indicate a rough balance of the bridge and the potential measuring means be employed to indicate a fine balance of the bridge.

It is not intended that this invention be limited by the specific embodiments described for it is apparent that many modifications can be made by persons familiar with this art without departing from the spirit of the invention. For example, the detection zone in which the liquid measuring capacitor is placed could be inserted directly in the pipeline rather than in a sampling line. The scope of this invention is to be limited only by the following claims.

What is claimed is:

1. In the transportation of petroleum liquids through pipelines, wherein separate batches of different liquids are passed successively through the same pipeline, the method of detecting a batch change at a selected point in the line which comprises continuously passing a stream of the liquid, flowing through the pipeline at the point selected, through a detection zone, employing said liquid in said detection zone as the dielectric in an electrical capacitor, balancing the capacitance of said capacitor against a variable capacitor in a capacitance bridge, balancing the resistance of said first capacitor against the resistance of a variable resistor placed in parallel with said variable capacitor in said capacitance bridge, continuously measuring the balance of said bridge and detecting an unbalance of said bridge as an indication of a batch change in the liquid passing through the pipeline.

2. Method according to claim 1 in which said capacitance bridge is fed with an alternating current in the range of 5,000 to 15,000 cycles per second.

3. Apparatus for detecting a change in the nature of a liquid stream flowing through a pipeline comprising an electrical capacitor adapted to receive a stream of liquid between its plates, means for conducting a continuous flow of at least a portion of said stream through said capacitor to function as the dielectric in said capacitor, an A. C. capacitance bridge, said capacitor constituting one leg of said bridge, a variable capacitor and a variable resistor shunted across said variable capacitor together constituting a second leg of said bridge, an oscillator feeding the input of said bridge, rectifying means connected to the output of said bridge, a fixed resistor and current measuring means shunted in series across the output of said rectifying means, and potential measuring means connected to the terminals of said fixed resistor, whereby said current measuring means functions to indicate a rough balance of said bridge and said potential measuring means functions to indicate a fine balance of said bridge.

WILLIAM A. BRUCE.

References Cited in the file of this patent

UNITED STATES PATENTS

| Number | Name | Date |
|---|---|---|
| 1,166,159 | Thomas | Dec. 28, 1915 |
| 1,475,240 | Osborne | Nov. 27, 1923 |
| 1,518,543 | Nyquist | Dec. 9, 1924 |
| 2,071,607 | Bjorndal | Feb. 23, 1937 |
| 2,357,023 | Reid et al. | Aug. 29, 1944 |
| 2,485,579 | Elliott | Oct. 25, 1949 |
| 2,535,026 | Anderson | Dec. 26, 1950 |
| 2,599,583 | Robinson et al. | June 10, 1952 |

OTHER REFERENCES

Alternating Current Bridge Methods, by Hague, fourth edition, pages 335 to 337.